United States Patent [19]

Becker et al.

[11] 4,207,915
[45] Jun. 17, 1980

[54] BACK FLOW PREVENTER

[75] Inventors: Bernard B. Becker, Belmont; John K. Bowman, Brighton; Cyril A. Randall, Belmont, all of Mass.

[73] Assignee: Amtrol, Inc., West Warick, R.I.

[21] Appl. No.: 830,463

[22] Filed: Sep. 6, 1977

[51] Int. Cl.² ............................................. E03C 1/10
[52] U.S. Cl. ................................... 137/117; 137/116; 137/116.3; 137/218; 137/454.6; 137/549
[58] Field of Search ................ 137/115, 116, 116.3, 137/117, 218, 454.5, 454.6, 549

[56] References Cited

U.S. PATENT DOCUMENTS

| 2,310,586 | 2/1943 | Lohman et al. | 137/542 |
|---|---|---|---|
| 2,389,413 | 11/1945 | Carton | 137/12 |
| 2,503,424 | 4/1950 | Snyder | 137/116 |
| 2,586,942 | 2/1952 | Grove | 137/115 |
| 2,598,131 | 5/1952 | O'Donnell | 137/549 |
| 2,706,488 | 4/1955 | Harrington | 137/116 |
| 3,044,484 | 7/1962 | Dunning | 137/549 |
| 3,448,763 | 6/1969 | Curtiss | 137/503 |
| 3,636,968 | 1/1972 | Tine | 137/102 |
| 3,724,487 | 4/1973 | Hunter | 137/218 |
| 3,747,621 | 7/1973 | Tine | 137/218 |
| 4,037,617 | 7/1977 | Perales | 137/118 |

Primary Examiner—William R. Cline
Assistant Examiner—H. Jay Spiegel
Attorney, Agent, or Firm—C. Yardley Chittick

[57] ABSTRACT

A back flow preventer for preventing contamination of a water supply. The preventer includes check valves which are enclosed in a casing comprised of a body and a single removable cover. The check valves are vertically disposed and spaced laterally from each other. The valves may be removed for servicing when the cover is removed without disturbing other parts of the device. Between the check valves is a relief valve which opens to drain the passage between the check valves when there is a drop in the supply line pressure sufficient to cause actual or potential reverse flow back toward the supply line. The check valves open by movement in opposite directions. Each check valve unit includes a tubular strainer through which all water must pass. The check valve units, while identically dimensioned as to the valve structure, include other parts of unequal dimensions which preclude accidental reversal of the units when being initially assembled or replaced after servicing.

10 Claims, 9 Drawing Figures

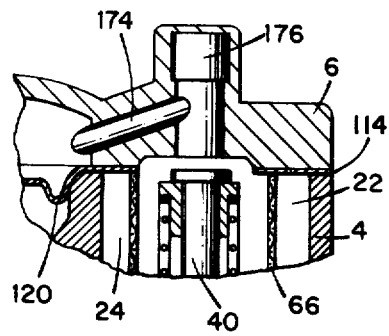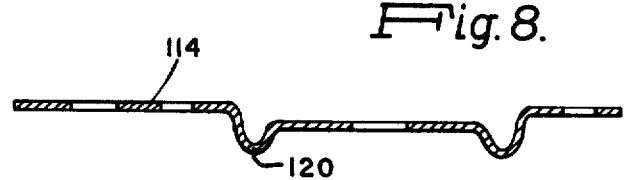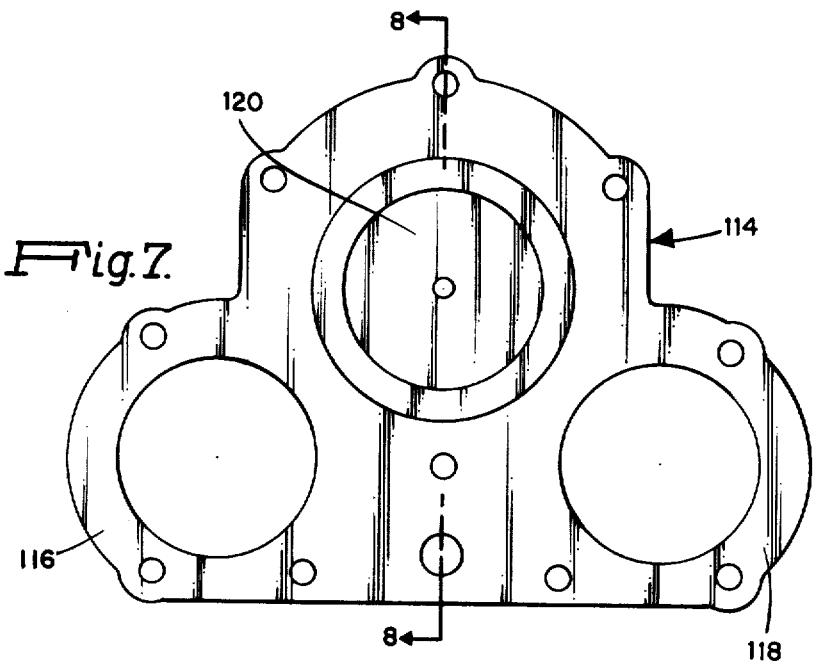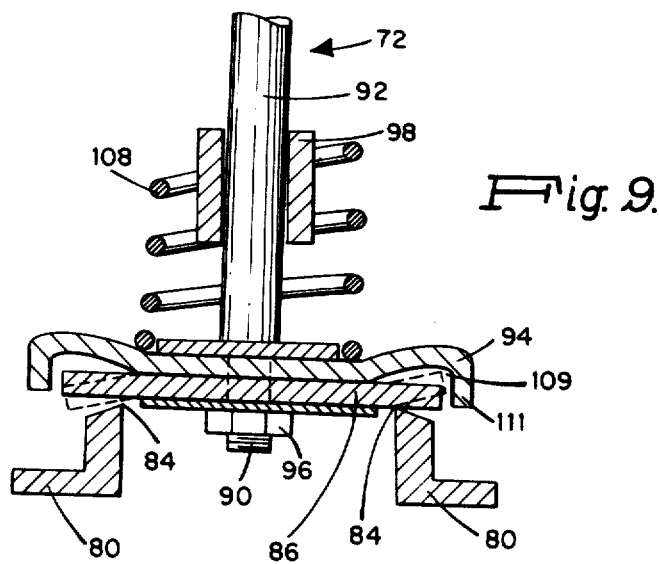

BACK FLOW PREVENTER

BACKGROUND OF THE INVENTION

Back flow preventers are required equipment in all potable water supply lines where there is any possibility of reverse back flow into the supply line due to changing pressures in the supply and outlet lines.

Back flow preventers now in use generally include two check valves arranged in series so that water under sufficient pressure on the supply side will cause the valves to open and flow freely to the outlet pipes. It is also customary practice to include in the passage between the check valves a relief valve which will automatically open should there by any flow in the reverse direction due to a drop in the supply line pressure and failure of one or both check valves to hold against higher outlet pressure. With the relief valve open, and contaminated or polluted water passing the downstream check valve in the reverse direction will be drained to atmosphere and thereby be prevented from entering the supply line.

The following U.S. patents are illustrative of the present state of the art. Carton U.S. Pat. No. 2,389,413; Snyder U.S. Pat. No. 2,503,424; Curtiss U.S. Pat. No. 3,448,763; Tine U.S. Pat. No. 3,636,968; Tine U.S. Pat. No. 3,747,621.

SUMMARY OF THE INVENTION

The present invention, while functioning in principle like some of the devices of the prior art, includes elements of construction which will lengthen the period of use before any malfunction, will simplify the overall valve construction and will permit the casing to be permanently installed in the water line since servicing the check valves and relief valve can be accomplished on site.

More specifically, the invention includes a casing with a tortuous passage therethrough in which are two horizontal laterally spaced circular interior flanges adapted to support two individual check valve units arranged in vertical position on the flanges. Each valve unit includes a tubular strainer through which all water must pass as it flows from supply to discharge. The strainers are of relatively fine screening with adequate flow capacity to prevent excessive pressure drop as the water passes the valve. The strainers are at the entrance and discharge ends of the intermediate passage so as to minimize the entry of foreign matter into the casing which might impair valve operation.

Within the casing and adjacent the intermediate portion of the passage between the check valves is a relief valve which opens whenever there is any predetermined drop in pressure in the supply line or any build up in pressure in the passage. Such increase in pressure in the passage could be caused by an increase in pressure in the discharge line in excess of the supply line pressure coupled with failure of the downstream check valve.

A novel feature of the relief valve construction is the use of a pressure controlled diaphragm which is an integral part of the gasket that provides the seal between the body and cover of the casing. In addition, the gasket has circular openings above the check valve units so that upon the removal of the cover, each check valve unit may be removed vertically from its operative position in the passage for repair or replacement without disturbing the relief valve and its associated diaphragm.

Another feature of importance is the construction of the valve units and cover whereby it is impossible to place a downstream check valve unit in the upstream location and vice versa. This is of importance because in servicing the preventer in the field a workman might accidentally reverse the check valve positions causing the device to become inoperative as to normal water flow and operative to permit reverse flow of contaminated water.

BRIEF DESCRIPTION OF THE DRAWINGS

FIG. 6 is a fragmentary vertical section taken on the line 6—6 of FIG. 1.

FIG. 7 is a plan view of the gasket which includes the relief valve diaphragm.

FIG. 8 is a section on the line 8—8 of FIG. 7.

FIG. 9 is an enlarged simplified cross-sectional view of the downstream valve showing structure which permits the valve member to engage the seat in sealing contact about its entire circumference even though the valve stem may be slightly misaligned.

DESCRIPTION OF A PREFERRED EMBODIMENT

Figure 1:
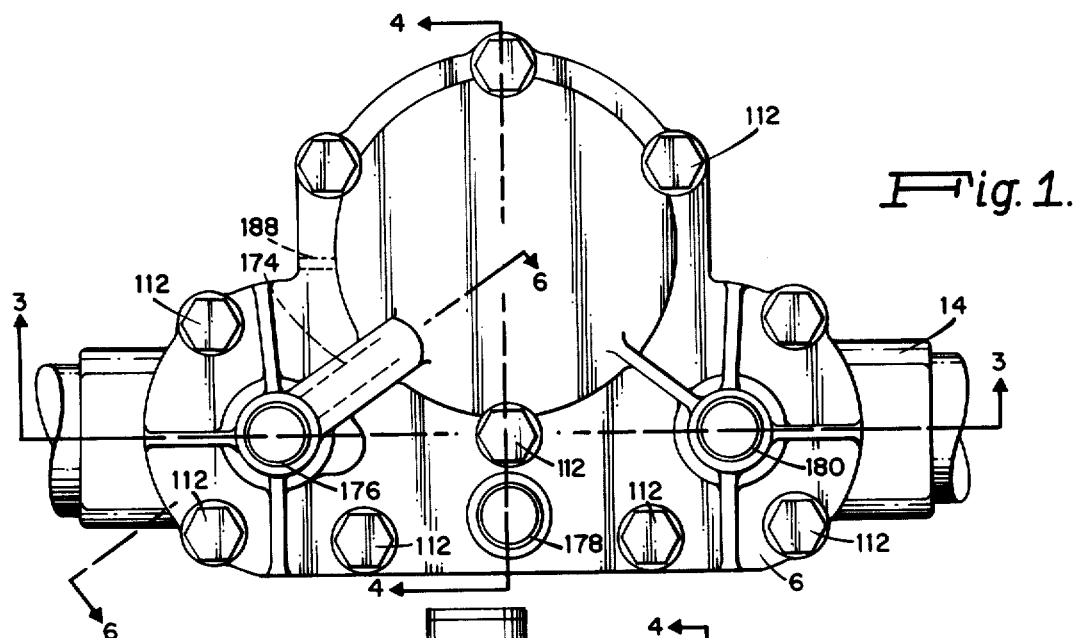
FIG. 1 is a top plan view of the casing with the cover in place.

Referring to FIGS. 1 to 5, there is shown a casing 2 comprised of a body 4 and a cover 6. The body has an inlet 8 interiorly threaded at 10 for connection with a supply pipe 12. At the other end of the body is an outlet 14 interiorly threaded at 16 for connection with a discharge pipe 18.

The passage from inlet 8 to outlet 14 is tortuous, with the intermediate part of the passage being along the bottom of the body as at 20.

Figure 3:
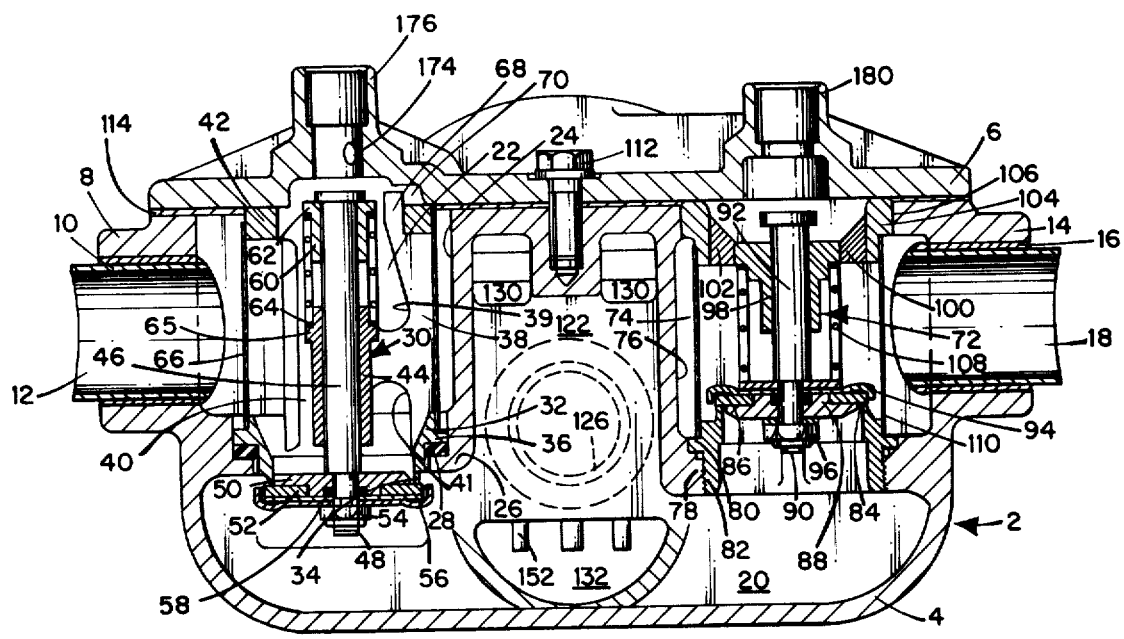
FIG. 3 is a vertical section taken on the line 3—3 of FIG. 1.

The body 4 as viewed in FIG. 3 is substantially symmetrical. At the inlet end, there is a vertical cylindrical cavity 22 defined by a curved wall 24. The lower end of cavity 22 is defined by a horizontal circular flange 26 which supports a circular rubber gasket 28. Positioned on gasket 28 is a first removable check valve unit 30.

Unit 30 is comprised of a circular member 32, the lower end of which forms a circular valve seat 34. Member 32 has an outer flange 36 which rests in water tight relation on gasket 28.

Extending upwardly from circular member 32 are three vertical webs 120° apart. Two of these webs are shown in FIG. 3 at 38 and 40. The webs connect at their upper ends with a ring 42. The webs support an axially positioned valve guide 44. The webs are cut away as at 39 and 41 to minimize restriction of flow of water thereby.

A post 46 with a downward threaded extension 48 is positioned in guide 44 carried by the webs 38 and 40. A disc 50 having on its underside a circular rubber valve member 52 is secured to post 46 by nut 54 and a backing plate 56. Valve member 52 is adapted to engage valve seat 34. An O-ring 58 prevents any leakage through the center hole in the disc 50.

The backing plate 56 is of novel construction designed to cooperate with the resilient seal or valve member 52 to insure complete engagement with valve seat 34 even if the post or valve stem 46 is slightly out of alignment. The backing plate construction will be described in more detail hereinafter.

On the upper end of post 46 is a short sleeve 60 with a flange 62 at its upper end. A compression spring 64 is mounted between flange 62 and flange 65 on guide 44 to normally maintain valve member 52 in closed position. The spring 64 permits valve member 52 to open whenever the upstream pressure on disc 50 is adequate to overcome spring 64 and the back pressure in passage 20.

A cylindrical screen 66 for blocking debris flowing downstream is mounted on member 32 and ring 42. The mesh of the screen permits adequate water flow therethrough when the valve 52 is open.

In order to insure correct angular positioning of valve unit 30 on gasket 28, the web 38 has an upward projection 68 which fits into a cooperating recess 70 in the underside of cover 6.

From the description thus far, it will be understood that the valve unit 30 is an entity which upon removal of cover 6 may be withdrawn vertically from its normal location as shown in FIG. 3.

At the discharge end of the body 4 is a second removable check valve unit 72. This valve unit functions in a manner similar to valve member 30, differing however in that the valve opens by upward movement. Additionally, the mounting means is completely different so that there is no possibility of incorrect insertion of the valve units in the body during initial assembly or when making repairs in the field.

The second check valve 72 is mounted in a cavity 74 defined by a circular wall 76 which terminates at its lower end in an inturned threaded flange 78. A circular member 80, threaded at its lower end 82, makes screw threaded water tight engagement with flange 78. The upper end of member 80 provides a circular valve seat 84, which valve seat is normally maintained closed by engagement with a rubber circular valve member 86.

Valve member 86 is mounted between a disc 88 on its underside and a backing plate 94 on its upper side. This assembly is secured to post 92 by nut 96 screwed on the threaded end 90. Post 92 is vertically movable within sleeve guide 98 which guide is supported by webs 100 and 102 extending inwardly from ring 104 which fits closely within circular opening 106 in the upper part of body 4.

Backing plate 94 like backing plate 56 is of novel construction. It cooperates with valve member 86 in a manner to insure complete closing against valve seat 84 even if the valve stem or post 92 is slightly out of axial alignment. This construction will be described in more detail hereinafter by reference to FIG. 9.

When valve unit 72 is in position as shown with the ring 104 held down by cover 6, a compression spring 108 holds valve member 86 firmly against seat 84. Valve member 86 will open when the pressure in passage 20 is sufficient to overcome spring 108 and the pressure on the discharge side in pipe 18.

A screen 110 extends from circular member 80 to ring 104 so that all water flowing through the valve must pass through the screen. The mesh of screen 110 is the same as the mesh screen 66 so that flow is not inhibited.

In assembling the second check valve unit 72 in body 4, the circular member 80 is first screwed into flange 78. Then the screen 110, ring 104 and the associated valve parts are lowered into position. Ring 104 will extend above the top surface of body 4 until cover 6 is applied, forcing ring 104 down to the position shown in FIG. 3 and compressing spring 108 to the required degree.

At this point in the description and without any reference to the relief valve which will be referred to shortly, attention is called to the cover 6 shown in plan in FIG. 1 and in section in FIG. 3 on the line 3—3 of FIG. 1.

The cover is held in position on body 4 by a plurality of cap screws 112 which are threaded into body 4. A gasket 114 shown in FIG. 7 is positioned between the body and the cover. The circular part of the gasket indicated at 116 in FIG. 7 rests on the upper end of wall 24 and the circular part indicated at 118 rests on the upper end of wall 76. The rest of gasket 114 is comprised principally of a large surface 120 which is the diaphragm portion which actuates the relief valve. This will be explained in more detail hereinafter.

It will also be noticed that the interior circular openings in parts 116 and 118 of gasket 114 are of sufficient diameter to permit check valve units 30 and 72 to be withdrawn vertically from cavities 22 and 74 respectively without disturbing the gasket 114 and the diaphragm portion 120 that is integral therewith.

NORMAL OPERATION OF THE CHECK VALVE UNITS

The water in supply line is under sufficient pressure to cause valve member 52 to open against spring 64 permitting water to flow into passage 20. While there is a drop in pressure in passage 20, nevertheless the pressure in the passage is sufficient to cause the second valve member 86 to open against spring 108 permitting water to flow through outlet 14 to the distribution pipes.

This procedure is the normal and hoped for continued behavior of the system.

RELIEF VALVE

If the two check valves 30 and 72 worked perfectly, back flow from outlet to inlet could not occur when the pressure at the outlet exceeded the pressure at the inlet. However, experience has shown that there is always some likelihood that valves closed by water pressure and spring pressure will leak more or less, particularly when some bits of foreign matter get locked between the valve seat and valve member. Since public safety is involved, back flow of contaminated or polluted water into the water supply line must be positively prevented.

This result is achieved by the introduction of an automatically operating relief valve connected to the passage between the two check valves. The relief valve automatically opens whenever the pressure differential between the supply and outlet pressures drops to a predetermined figure or less. The relief valve drains away to the atmosphere water that may have worked its way back into passage 20 through check valve unit 72.

As soon as the inlet pressure rises to normal or the outlet pressure drops to restore the proper differential, the relief valve automatically closes so that normal flow can be resumed.

The relief valve structure is as follows. The body 4 contains an intermediate wall 122, running from cavity 22 to cavity 74 and effectively separating passage 20 from the remainder of the body to provide an interior space 124. Opposite wall 122 is a relief opening 126 to the atmosphere. Opening 126 is interiorly threaded at 128 so that a piping connection can be made if desired.

Upper and lower relief ports 130 and 132 through wall 122 connect passage 20 with space 124. The flow of water from passage 20 to space 124 is normally blocked by upper and lower valves 134 and 136 located adjacent ports 130 and 132 and arranged for joint operation by diaphragm 120.

Diaphragm 120 as previously noted is an integral part of gasket 114. As can best be seen in FIG. 4, the cover 6 is recessed at 138 at that area that overlies the diaphragm. A centrally located vertical valve post 140 has clamped to its upper end by nut 142, a retaining plate 144, diaphragm 120, diaphragm piston 146, circular valve member 148 and disc 150 carrying a plurality of downwardly extending guide legs 152.

Interposed between port 130 and space 124 is horizontal wall 154 having a threaded opening in which is screwed a short cylindrical member 156, the upper end of which comprises a circular valve seat 158 against which the valve member 148 is adapted to make sealing engagement. The guide legs 152 are freely slidable within cylindrical member 156.

The lower end of post 140 carries an O-ring 160 secured between flanges 162 and 164 that extend from supporting body 166. Guide legs 168 extend downward from flange 164. A circular opening 170 in the lower horizontal part of wall 122 is sized to receive the guide legs 168 in freely sliding relation and the O-ring 160 in tight sealing relation.

Figure 4:
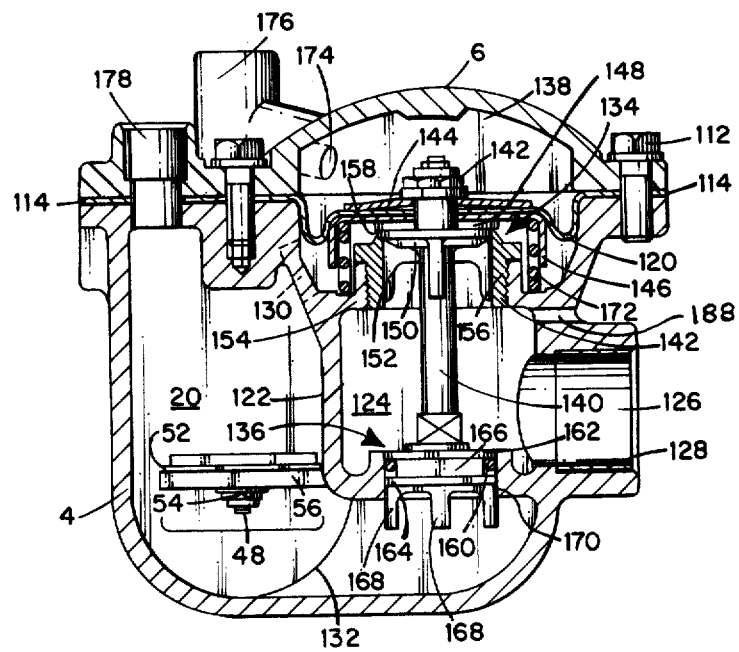
FIG. 4 is a vertical section taken on the line 4—4 of FIG. 2 with the relief valve closed.

A compression spring 172 is interposed between wall 154 and diaphragm piston 146 to constantly urge the valves 148 and 160 toward open position and to hold them in open position in the absence of an overriding pressure on the top of diaphragm 120. In FIG. 4, the pressure in the cover recess 138 is that of the pressure in the supply line 12, the water entering from cavity 22 through a port 174. This pressure is normally greater than the pressure in passage 20 and great enough to overcome spring 172 to hold valves 148 and 160 in closed position.

Figure 2:
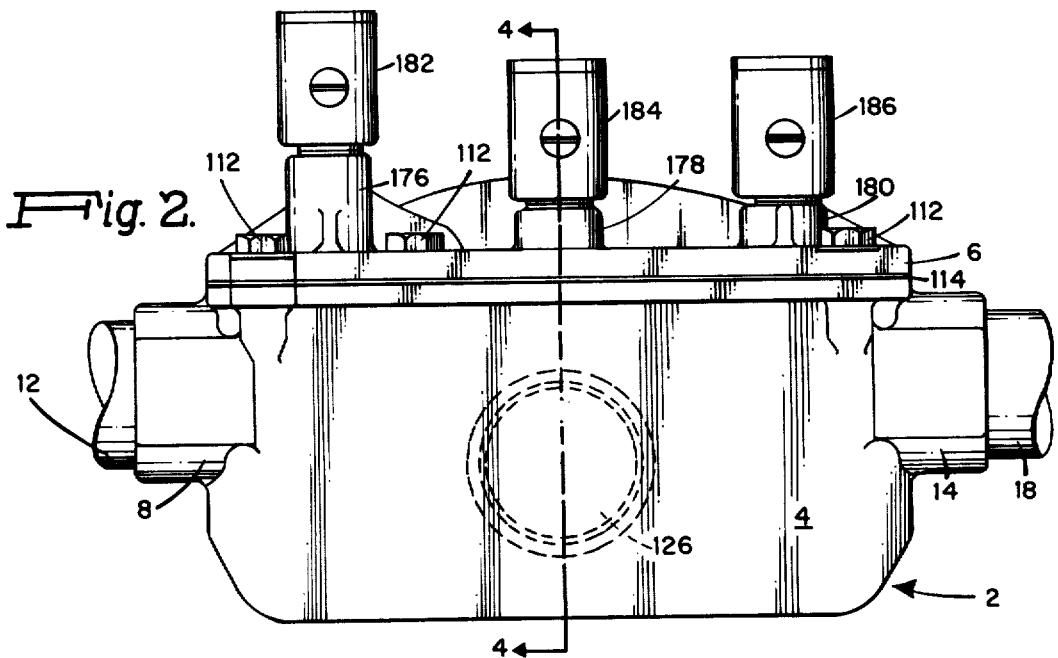
FIG. 2 is a front elevation of FIG. 1.
Figure 5:
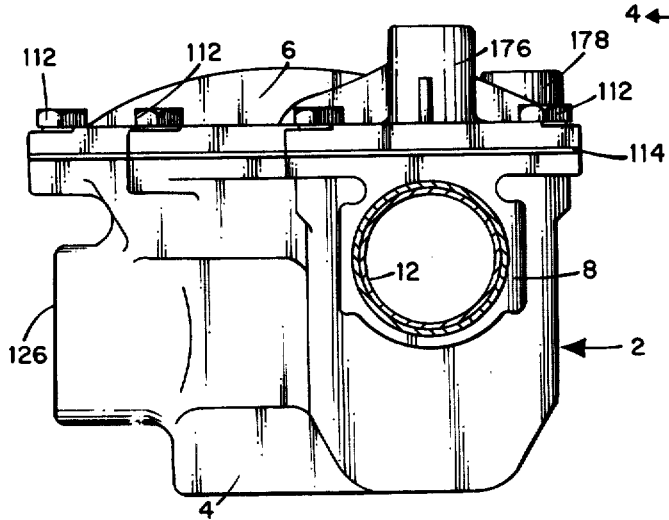
FIG. 5 is an end elevation looking from the left of FIGS. 1 and 2.

Referring to FIGS. 1, 2, 3, 5, and 6 it will be noted that cover 6 has three vertical openings therethrough, 176, 178 and 180 all of which are internally threaded and adapted to receive therein normally closed valves 182, 184 and 186 shown in dotted lines in FIG. 2. Alternatively the openings 176, 178 and 180 may be closed by conventional pipe plugs (not shown).

Opening 176 is connected with cavity 22 and the supply line. Opening 178 is connected with passage 20 and opening 180 is connected with cavity 74 and the outlet line.

With relief valves 134 and 136 closed as shown in FIG. 4, water flows normally through check valve unit 30, through passage 20 and through the second check valve unit 72 to the outlet and distribution pipes.

From the foregoing description of the structure, it will be understood that this back flow preventer will act automatically and reliably to prevent whatever liquid may be in the pipes on the outlet side from flowing backward into the supply line whenever the pressure in the supply line falls below a predetermined differential with respect to the pressure in passage 20.

If the check valve unit 72 holds against back flow, there will be no discharge through the relief valve.

If the check valve unit 72 fails to prevent back flow, then the pressure of water collecting in passage 20 will cause relief valves 134 and 136 to open so that water can flow from passage 20 to relief opening 126 to atmosphere. Back flow water in passage 20 is under no pressure because the relief valves 134 and 136 are open. Hence there can be no flow backward through check valve unit 30 which is held closed by spring 64.

As soon as pressure is restored in the supply line 12, the required differential over the pressure in passage 20 will immediately develop and the relief valves 134 and 136 will be closed. Water will then commence to flow normally downstream.

If there should be a positive blockage of flow on the outlet side, then pressure would build up in the passage 20, which would again cause the relief valves 134 and 136 to open even though no pressure drop on the inlet side had occurred. With the relief valve open, supply water would flow into passage 20 and out through the relief valves to atmosphere.

Thus regardless of pressure changes that could cause back flow into the supply pipe, the structure of this disclosure effectively prevents such happening.

As a further safety precaution, there is incorporated a secondary opening 188 through the wall of the body, leading from space 124 to atmosphere. Thus, if the air gap required by the plumbing code in the pipe (not shown) leading from opening 126 to a drain, should inadvertently become clogged, the opening 188 acts as a secondary air gap to prevent the development of negative pressure in space 124. Also if the drain pipe should be clogged, then water flowing out of opening 188 would give a warning of this condition.

In order to check existing pressure conditions, pressure gauges may be screwed into valves 182, 184 and 186, the valves opened and the pressures read.

If it should be determined that either or both of the check valve units 30 and 72 need replacing, shut-off valves (not shown) in the supply and outlet lines may be closed, and cover 6 removed leaving the gasket 114 in place. Check valve unit 30 may be withdrawn through the gasket opening above cavity 22 and check valve unit 72 unscrewed and withdrawn through the gasket opening above cavity 74.

These operations may be performed without having to remove the casing from the attached water lines.

If there is trouble with the relief valves, they may readily be removed for servicing in the following manner. Cover 6 is removed to expose gasket 114 in its entirety. The gasket which includes the diaphragm 120 is then removed carrying with it all of the valve structure associated with the post 140. Repairs can then be made and the parts reassembled.

MEANS FOR IMPROVING THE SENSITIVITY OF THE CHECK VALVES

It will be appreciated that the valve stems 46 and 92 carrying the flexible valve members 52 and 86 respectively are in free sliding engagement with their guides 44 and 98. This freedom of movement is necessary so that the relatively weak springs 64 and 108 required to minimize pressure drop will always be able to move the valve members 52 and 86 to closed position when fluid pressure conditions permit.

Due to lack of lubrication, wear gradually occurs between the valve stems 46 and 92 and their guides 44 and 98. The result is that the valve stems may at times be slightly cocked in their movement so that the valve members 52 and 86 do not always squarely engage valve seats 34 and 84 respectively.

Thus when the valve members do not engage the valve seats with equal pressure throughout the entire circular line of contact, leakage is likely to develop.

Means for overcoming this leaking tendency is shown in FIG. 9. Wear has occurred between valve stem 92 and guide 98. The spring 108 has forced valve member 86 into engagement with valve seat 84 with the stem 92 out of alignment with the axis of seat 84. Valve member 86 thus engages valve seat 84 through only part of its circumference. The valve remains slightly open at the left permitting objectionable leakage.

Unless the valve member 94 slides to the right as viewed in FIG. 9 to bring valve member 86 into 360° engagement with valve seat 84, leakage will continue. Such sliding movement may or may not occur. Therefore a construction has been provided which will insure closing regardless of the position of valve stem 92.

The valve member 86 is made of flexible material capable of bending under the pressure applied by spring 108. Backing plate 94 is dished upwardly at its outer annular area to provide an annular space or cavity 109 between it and the outer part of member 86. Backing plate 94 terminates in a circular downturned flange 111 which is spaced from the periphery of member 86 so that water can enter the cavity therebetween.

As the water pressure differential increases on the downstream side of valve unit 72 to a sufficient degree, spring 108 forces valve member 86 into partial engagement with valve seat 84 as shown in FIG. 9. The valve member 86 is so flexible however that the pressure of spring 108 bends the valve member 86 at the right up into cavity 109 as indicated by the dotted lines. This allows the valve stem 92 and valve member 86 to move downward a sufficient distance to permit valve member 86 to make 360° engagement with valve seat 84 thereby to stop leakage and to increase the pressure difference between the opposite sides of the valve. Water enters the annular cavity to help force valve member 86 against seat 84.

Thus with the construction just described, in which the valve stem may be misaligned at the time of initial contact of valve member 86 with seat 84, complete sealing of the valve can take place without subsequent lateral movement of the valve member 86 with respect to the seat 84.

The backing plate 94 with lip 111 is preferably a stamping but any other suitable construction such as a machined part could be used.

It should also be mentioned that the circular valve seat 84 may be beveled as shown in FIG. 9 to provide a somewhat pointed seat. Good sealing results have been obtained with a bevel angle of about 5°. This is not intended however to put any limitation on the configuration of the valve seat.

The foregoing description of the behavior of valve member 86 with respect to valve seat 84 and backing plate 94 in valve unit 72 is equally applicable to the behavior of valve member 52 with respect to valve seat 34 and backing plate 56 in valve unit 30 when wear has occurred between valve stem 46 and guide 44.

The foregoing description of a preferred embodiment of the invention is to be considered as illustrative and not in any way limiting. Other modifications which will suggest themselves to persons skilled in the art are intended to be covered by the appended claims.

We claim:

1. A back flow preventer valve comprising a single unitary horizontal body, a one piece removable cover, a one piece gasket for making a watertight seal between said body and cover, horizontally aligned entrance and exit, a tortuous passage connecting said entrance and exit, the portions of said passage adjacent said entrance and exit being vertical and spaced from each other to provide an intermediate portion of said passage, first and second vertical check valve units removably positioned in the vertical portions of said passage, the said first unit having a first strainer on the upstream side of the valve in said first unit, said first strainer being maintained against removal from said first unit by said cover, the said second unit having a second strainer on the downstream side of the valve in said second unit, said second strainer being maintained against removal from said second unit by said cover, a bypass leading from said intermediate portion to an opening to atmosphere through said body, a relief valve for closing or opening said bypass, said gasket having as an integral part thereof of a diaphragm attached to said relief valve, an opening through said gasket above said first check valve unit large enough to permit the removal of said first unit when said cover has been removed from said body without disturbing said gasket, a passage in said cover running from a position above said first unit to a position above said diaphragm whereby upstream pressure can be applied to the upper side of said diaphragm, the under side of said diaphragm being subject to the pressure in said intermediate portion, the aforesaid construction being such that when the upstream pressure on said diaphragm is in excess of a predetermined differential above the intermediate portion pressure, said relief valve will be closed to prevent flow to said opening and when the pressure differential between said upstream pressure and said intermediate portion pressure is reduced below a predetermined amount, said diaphragm will move said relief valve to open said bypass to permit flow from said intermediate portion to said opening through said body.

2. The construction set forth in claim 1, said gasket having a second opening therethrough above said second check valve unit whereby when said cover is removed from said body, said second unit may be removed without disturbing said gasket.

3. The construction set forth in claim 1, said check valve units differing in construction to such an extent that they are not interchangeable as to their positions in said passage.

4. The construction set forth in claim 1, the said opening to atmosphere being through the side of said body.

5. A back flow preventer valve comprising
a two part casing, said casing comprising a valve containing body, a relatively flat removable cover, a gasket for making a watertight seal between said body and cover, said body having at its ends a supply entrance port and a discharge exit port with a continuous tortuous passage therebetween, first and second valve units with first and second spring loaded valves mounted in series in said passage, whereby liquid under adequate supply pressure may flow through said first valve unit, said passage and said second valve unit, said first valve unit including a first strainer surrounding the said first valve on the upstream side, and maintained against removal by said cover, said second valve unit including a second strainer surrounding the said second valve on the downstream side, and maintained against removal by said cover, a relief bypass leading from said passage at a position between said valve units to a relief opening through said body, a relief valve for controlling the flow of liquid from said passage through said bypass to said relief opening, said relief valve connected to and actuated by a pressure controlled diaphragm integral with said gasket and mounted between said body and cover and a passage in said cover leading from a position upstream of said first valve unit to a position above said diaphragm, said first and second valve units being removably mounted in said passage for withdrawal from said body in the direction of said cover, said gasket having openings aligned with said valve units, whereby after said cover is removed from said body said valve units may be removed without disturbing said gasket and/or the said relief valve diaphragm.

6. The construction set forth in claim 5, a first interior horizontal circular flange extending about said passage near the entrance port, said first valve unit having a first circular member with a valve seat at its lower end, an exterior circular flange extending about said member above said seat and supported by said first interior flange, said first exterior flange acting as a support for said first strainer, a second interior horizontal circular flange extending about said passage near the discharge port, said second valve unit having a second circular member with a valve seat at its upper end, an exterior circular flange extending about said member below said seat and supported by said second interior flange, said second exterior flange acting as a support for said second strainer.

7. The construction set forth in claim 5, one of said valve units having an element that extends through and above said gasket, said cover having a cooperating recess to receive said element whereby if said valve units are interchanged, said cover cannot be applied to said body.

8. A back flow preventer valve comprising a two part casing, one part being a valve containing body and the other part being a removable cover, a gasket for making a watertight seal between said body and cover, said body having a supply entrance port and a discharge exit port with a continuous tortuous passage therebetween, two spring loaded normally closed valve units mounted in series in said passage, the first valve unit comprising a first structure which by vertical movement may be placed in and removed from a first position in said passage, said structure comprising a first circular member including at its lower end a first circular valve seat, supporting means in said passage for removably receiving said first circular member in sealed relation thereto and at a right angle to the axis of said entrance port, a valve member for engaging said first circular valve seat, a valve stem extending vertically upward from said valve member, a compression spring positioned between a spring support fixed in relation to said valve seat and a part of said valve stem for maintaining said first valve member normally closed, said first valve unit including a first strainer surrounding the upstream side of said first valve unit whereby all water from the supply must pass through said strainer before reaching said first valve seat and valve member, said first valve unit and strainer being held in operative position by said cover, a second valve unit comprising a second structure which by vertical movement may be placed in and removed from a second position in said passage, said second structure comprising a second circular member including at its upper end a circular valve seat, supporting means in said passage for removably receiving said circular member in sealed relation thereto and at a right angle to the axis of said exit port, a second valve member for engaging said second valve seat, a valve stem extending vertically upward from said second valve member, a compression spring having one end fixed in relation to said valve seat and the other end pressing downwardly on said valve member for maintaining said second valve member normally closed, said second valve unit including a second strainer surrounding the downstream side of said second valve unit whereby all water passing through said second valve when open must thereafter pass through said second strainer before reaching said exit port, said second valve unit and strainer being held in operative position by said cover, said body including a walled space adjacent the intermediate part of said passage between said valve units, a relief opening through the side of said body leading from said space to atmosphere, two relief ports leading from said intermediate passage to said space, relief valve means for simultaneously closing or opening said two relief ports, and a diaphragm integral with said gasket subject to supply water pressure on one side and intermediate passage pressure on the other for controlling the position of said relief valve means.

9. The construction set forth in claim 8, said first strainer being tubular in form with its upper end in engagment with a circular part of said first valve unit and its lower end supported by said first circular member, said second strainer being tubular in form with its upper end in engagement with a circular part of said second valve unit and its lower end supported by said second circular member.

10. The construction set forth in claim 8, the vertical dimensions of said first and second valve units being unequal whereby if the positions of said valve units and associated strainers are interchanged in said body, said cover cannot be closed.

* * * * *